June 29, 1965     W. C. BOYCE     3,191,994

ARM RESTRAINT

Filed Feb. 27, 1964

INVENTOR.
WILLIAM C. BOYCE
BY
ATTORNEYS

United States Patent Office 3,191,994
Patented June 29, 1965

3,191,994
ARM RESTRAINT
William C. Boyce, Dallas, Tex., assignor, by mesne assignments, to the United States of America as represented by the Secretary of the Air Force
Filed Feb. 27, 1964, Ser. No. 347,977
2 Claims. (Cl. 297—411)

This invention relates to an arm restrain for use with a restraint system for the protection of astronauts or occupants of high performance aircraft. More particularly, it is a simple, broad strap passed through the crook of the elbows so that when restraint is applied, the arms are forced downward and aft into deeply contoured arm rests.

There are many devices for restraining the arms of astronauts in personnel restraint systems, most of which consist of rigid gauntlets or fabric sleeves, or coverings which are permanently attached to the arm and which are themselves attached to straps or cables. This further encumbers the arm when the system is unrestrained and makes use of the arm awkward. A single device is indicated, therefore, which will leave the hand and arm free and unencumbered when restraint is not applied, but which will apply restraint automatically when it is needed. Such a device is provided by this invention.

It is an object of this invention, therefore, to provide an arm restraint for use with a personnel restraint system which allows the free use of hands and arms when the system is unrestrained.

It is another object of this invention to provide an arm restraint device which will automatically protect the arms of an astronaut when system restraint is applied.

It is still another object to supply an arm restraint device which is simple in construction and can be manufactured economically from readily obtainable materials that lend themselves to standard mass production manufacturing techniques.

It is a further object of this invention to provide an arm restraint device which will protect an astronaut and which can be easily fitted into a personnel restraint system.

Figure 1:
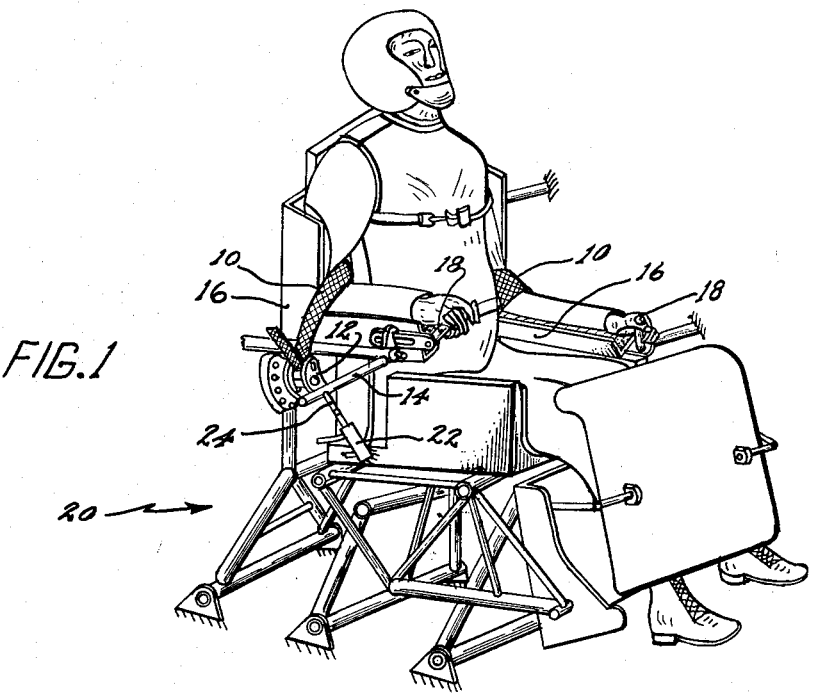
Figure 2:
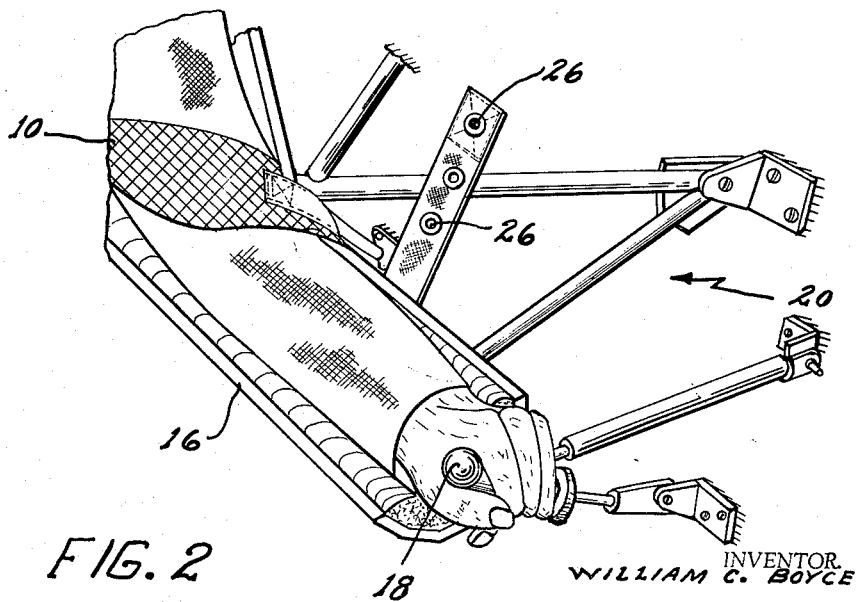

These and other advantages will be apparent upon consideration of the following detailed description, especially when taken in conjunction with the accompanying drawings, in which:

FIGURE 1 shows an oblique view of an astronaut seated in a restraint system with full restraint applied and a strap, which is the subject of this invention, holding the astronaut's arm down and aft in a contoured arm rest; and FIGURE 2 is a pictorial view of the left arm of an astronaut in place in a contoured arm rest with an alternative mode for obtaining restraint.

In FIGURE 1, 10 represents a strap, which may be of woven fabric or any suitable material, shown passing through the crook of the astronaut's elbow and forcing it aft and into the contoured arm rest 16 of the seat 20. The strap is held in a conventional, quick release, or adjustable buckle 12, which is attached to a hinged or pivoted arm 14. The adjustable buckle 12 is of the type currently utilized with adjustable seat belts. The other end of the said strap is attached adjacent the upper arm of the astronaut to the inner portion of the arm rest 16 and in the drawing cannot be seen.

The arm 14 is hinged or pivoted to the arm rest 16 and is movable through an arc from the position shown in the drawing, wherein restraint is applied, to a position approaching the vertical which would allow for release of restraint. The buckle 12, since it is hinged to the arm 14, carries the strap upwardly to allow free movement of the astronaut's arm when restraint is not applied. The arm 14 may be actuated by any conventional means, for example, the hydraulic cylinder and piston arrangement 22 as shown in FIGURE 1 which has an idler link 24 pivotally connected between the piston rod and arm 14. When the arm 14 is lowered by the hydraulic jack 22, the strap 10 is forced into the crook of the astronaut's elbow and positions the arm firmly into the contoured rest 16. A hand hold or grip 18 is provided for the astronaut's hand and may contain means for operation of the hydraulic mechanism 22 to actuate restraint.

As shown in FIGURE 2, the restraint may be applied by fixing the buckle 12 to the arm rest 16 of the seat structure 20 and applying a tensioning device to one of the eyelets 26 in the strap 10. An example of the type of device which could be utilized with this system is shown in co-pending application Serial No. 347,970 to Howard E. Freeman, filed on even date herewith and titled "Cable Tension Adjusting Device." A conventional pulley also could be secured to the end of the strap 10 with motor actuation reeling up the strap for restraint. The buckle 12 in this embodiment would be fixed to the arm rest 16 and could be a guide bar or eye for support of the strap.

Thus, I have shown a device for the protection of the arms of an astronaut which can be easily incorporated in a restraint system which frees the astronaut's arm when control is relaxed and which automatically protects the arms when restraint is applied.

Although the invention has been described with reference to particular embodiments, it will be understood to those skilled in the art that the invention is capable of a variety of alternative embodiments within the spirit the scope of the appended claims.

I claim:

1. An arm retraint for the protection of astronauts comprising a contoured arm rest having one portion substantially vertical for the upper arm of an astronaut and a second portion substantially horizontal for the lower part of an astronaut's arm, a strap secured at one end to the upper arm portion of said arm rest at the side thereof which would be adjacent to an astronaut's body, means located adjacent the lower portion of said arm rest for guiding said strap such that when said strap is in restraint position it extends from the inner part of the upper arm of the astronaut across the crook of the elbow over a portion of the lower arm, said means for guiding comprising a quick-disconnect buckle, and means for tensioning said strap to apply restraint, said means for tensioning comprising an arm secured to said buckle and said horizontal portion of said arm rest for movement of said buckle from a position above said arm rest to one below said arm rest.

2. An arm restraint for the protection of astronauts comprising a contoured arm rest having one portion substantially vertical for the upper arm of an astronaut and a second portion substantially horizontal for the lower part of an astronaut's arm, a strap secured at one end to the upper arm portion of said arm rest at the side thereof which would be adjacent to an astronaut's body, means located adjacent the lower portion of said arm rest and secured thereto for guiding said strap such that when said strap is in restaint position it extends from the inner part of the upper arm of the astronaut across the crook of the elbow over a portion of the lower arm, and means secured to the free end of said strap for tensioning said strap to apply restraint.

References Cited by the Examiner

UNITED STATES PATENTS

| | | | |
|---|---|---|---|
| 2,638,293 | 5/53 | Lindstrom | 297—385 |
| 2,751,268 | 6/56 | Creelman | 269—328 |
| 2,766,463 | 10/56 | Bendersky | 297—385 |
| 3,038,175 | 6/62 | Faget et al. | 5—345 |
| 3,126,227 | 3/64 | Bollinger | 297—385 |
| 3,142,103 | 7/64 | Saunders | 244—122 |

FRANK B. SHERRY, *Primary Examiner.*